United States Patent

[11] 3,566,968

[72] Inventor John W. Marx
  Bartlesville, Okla.
[21] Appl. No. 874,542
[22] Filed Nov. 6, 1969
[45] Patented Mar. 2, 1971
[73] Assignee Phillips Petroleum Company

[54] MATERIAL AND METHOD FOR PREVENTING FLUID FLOW
  9 Claims, 3 Drawing Figs.
[52] U.S. Cl.................................................. 166/294,
  106/33, 252/8.5
[51] Int. Cl..................................................... C09k 3/12,
  E21b 33/138
[50] Field of Search............................................ 166/281-
  —283, 294, 295; 175/72; 252/8.5 (LC), 72
  (Inquired); 106/33 (Inquired); 260/(Inquired)

[56] References Cited
UNITED STATES PATENTS

| | | | |
|---|---|---|---|
| 2,064,936 | 12/1936 | McQuiston..................... | 175/72X |
| 2,065,512 | 12/1936 | Cannon......................... | 252/8.5(LC)X |
| 2,342,588 | 2/1944 | Larkin............................ | 175/72X |
| 2,778,604 | 1/1957 | Reistle.......................... | 175/72X |
| 3,145,773 | 8/1964 | Jorda et al..................... | 166/294X |
| 3,181,612 | 5/1965 | West et al..................... | 166/283 |
| 3,208,523 | 9/1965 | Coyle et al.................... | 175/72X |

Primary Examiner—Ian A. Calvert
Attorney—Young and Quigg

ABSTRACT: Preconditioned sponge particles in a water-free liquid are injected into fluid flow portions of the formation and expanded therein by contacting said particles with water to prevent lost circulation.

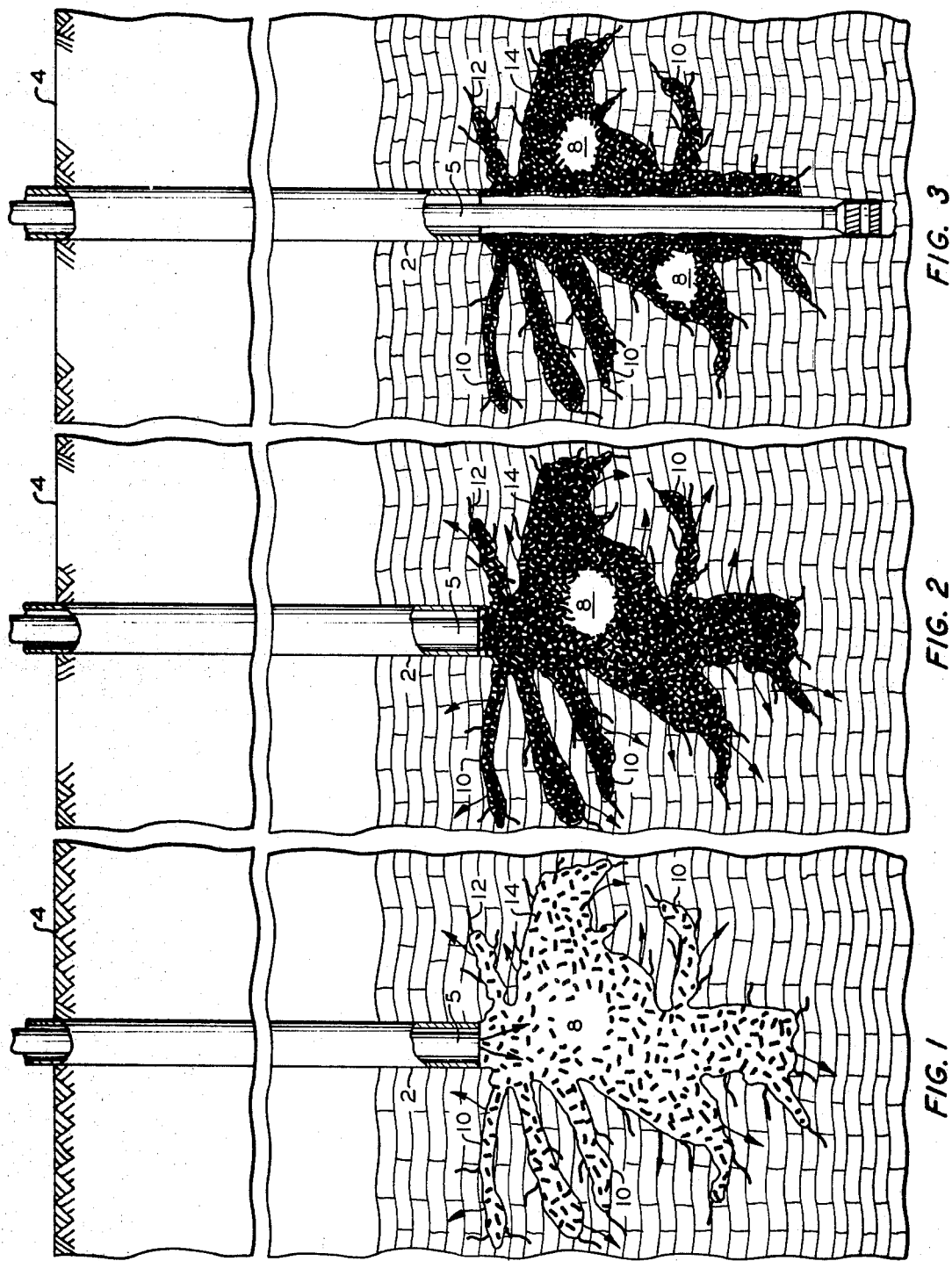

MATERIAL AND METHOD FOR PREVENTING FLUID FLOW

The invention relates to a material and a method for preventing fluid flow. In another aspect, this invention relates to a material and a method for plugging and preventing lost circulation in a subterranean formation penetrated by a well bore.

In the oil industry, particularly in the drilling of a well, the flow of fluids within a subterranean formation must sometimes be prevented. The operation of plugging formations or stopping lost circulation often results in great expenditures of time, labor, and equipment. The most difficult problem in stopping fluid flow in a subterranean formation is maintaining lost circulation particles at the desired position within the formation, i.e., within the cracks, fissures, and voids adjacent the well bore. This problem is made exceedingly more difficult during drilling operations where the well bore is to be drilled to greater depths than the location at which the lost circulation or fluid flow occurred. In such cases, drilling fluid is passed in contact with the lost circulation material during subsequent drilling which tends to dislodge and remove the lost circulation material from the well bore.

It is therefore an object of this invention to provide a material and method for preventing fluid flow. Another object of this invention is to provide a material and method for preventing fluid flow through an opening. Yet another object of this invention is to provide a material and method for preventing fluid flow in a portion of a subterranean formation adjacent a well bore wherein the material can be positioned in a desired subterranean location and more easily maintained in that location. Other aspects, objects, and advantages of the present invention will become apparent from a study of the disclosure, the appending claims, and the drawing.

In the drawing,

FIG. 1 is a diagrammatic view of a well bore in a subterranean formation, for example with openings such as washed out areas, fissures, and fractures with the material of this invention positioned therein;

FIG. 2 is a diagrammatic view of FIG. 1 with the lost circulation material expanded; and FIG. 3 is a diagrammatic view of FIG. 2 after subsequent drilling operations.

Referring to FIG. 1, a well bore 2 extends from the surface of the earth 4 downwardly to a subterranean formation 6. The formation 2 has been, for example, washed and broken during drilling operations causing cavities 8, fissures 10, and fractures 12 adjacent to well bore 2. The formation 6 is also such that fluid flows, for example, from the well bore 2 outwardly into the adjacent formation 6. A volume of synthetic sponge particles 14 of regenerated cellulose has been injected downwardly through the well bore 2, into contact with the formation, and forced against and into portions of the formation 6 adjacent the well bore 6. Here, for example, the particles 14 are injected through tubing 5.

The synthetic sponge particles 14 of regenerated cellulose forming the lost circulation material of this invention are produced in the form of platelets, for example, from commercial cellulose sponge by the process described below.

Commercial sponge of regenerated cellulose is wet with water and compressed, preferably between porous plates to facilitate later drying, to squeeze and force excess water therefrom. This compression should be sufficient to reduce the sponge dimensions along the compression axis to something in the order of one-twentieth to one-fiftieth of the original or greater. The remaining water within the sponge is removed by evaporation while the sponge is held under compression. Said evaporation may be expedited by heating and/or evacuation of the compression chamber. After the sponge is thoroughly dry the compression may be released and the dry flattened sponge sheets will not expand in hydrocarbons, anhydrous organic liquids, or in contact with atmospheric air. The sponge sheets expand very rapidly on contact with liquid water or brine. Said dried, compressed sheets of sponge can be cut into fragments of any desired size and dispersed in diesel oil, kerosene, or anhydrous crude oil for injection into the subterranean fissures, fractures, or cavities which generally cause the most serious lost circulation problems. Normally, these unexpanded fragments will be too large to enter the interstices between sand grains, so they will not plug oil pay zones adjacent said openings.

In order to more compactly fill the cavities 8, fissures 10, and fractures 12 of the formation 6 to assure fluid shutoff, it is preferred that the sponge particles be of different sizes. An example of a recommended particle size distribution for the particles of this invention is as follows: In the case of large formation openings, compressed sponge platelets of the order of ⅛ to ¼ inch thick with lateral dimensions of the order of one to six inches would be most effective. For smaller openings, small dried sponge cubes 1/16—1/4 inch on edge would be more suitable. In the general case where the size of the openings cannot be estimated, the injection would preferentially employ graded particle sizes, the leading edge of the injected material would consist of a dispersion of ⅛-inch cube particles followed by ½′ × ½′ × ⅛″ platelets followed by ½′ × ½′ × ¼″ platelets and so on up to one to 3-inch cubes, for example. Typically, a ½″ × ½″ × ¼″ inch platelet will expand on contact with water into a ½′ × ½′ rod 6 inches to 12 inches long, depending on initial compression applied during the drying. It has also been found useful to employ some particles that have the configuration of strips or strings having a length of one to several inches in order to cause interlocking of one group of particles with another. These longer length particles are particularly useful, as known in the industry, when sealing larger openings such as cavities 8 and fissures 10.

The sponge particles 14 are transported downwardly through the well bore 2 and forced into the cavities 8, fissures 10, and fractures 12 of the formation 6 by placing said particles 14 in a liquid that is substantially water free and pumping said mixture to the desired location. Continued pumping of liquid after the sponge particles 14 are in contact with the formation 6 causes the particles 14 to tightly wedge and compact into and against the formation 6. As the formation becomes progressively more tightly packed with particles 14, the pressure within the well bore increases thereby further urging the particles 14 in forceful contact with the formation 6. The sponge particles 14 are thereafter expanded within the cavities 8, fissures 10, and fractures 12, by contacting said particles 14 with water.

Referring to FIG. 2, upon contacting the sponge particles 14 with water, said particles will swell causing them to be tightly wedged within the formation 6 there to prevent fluid flow and lost circulation problems and to be maintained against displacement during subsequent drilling operations or other downhole work.

The sponge particles 14 can be contacted with water by pumping water downwardly through the well bore 2 and into the formation 6. During this pumping operation, the pressure often continues to increase owing to further compaction of the particles 14 into the formation 6. The water of a water based drilling fluid can also be used to expand the particles 14, but it is preferred that a drilling mud not be used during initial expansion of the particles in order to prevent formation of a filter cake on the particles and subsequent fluid shutoff prior to expanding substantially all of the particles 14. After substantial expansion and during subsequent drilling operations, for example, mud filter cake will form on the particles adjacent the well bore and further prevent fluid flow relative to the formation.

Water-free liquids that have been found particularly useful during transportation of the particles 14 to the formation 6 are crude oil, diesel oil, and kerosene. These liquids have been found particularly useful owing to their water-free characteristics and ready availability in the vicinity of most well locations.

In order to assure that the sponge particles 14 do not prematurely expand by contacting water present in the well bore 2 or the adjacent formation 6, it is preferred that a volume of water-free liquid such as oil, diesel, or kerosene, for example, be injected downwardly through the well and into the formation prior to injecting the sponge particles. As in the placement of the sponge particles by pumping them into the well, the spearhead slug of water-free liquid flows through the openings in the formation through which the lost circulation or fluid loss occurs and functions to force the water therefrom. It should be understood that the material and method of this invention is not restricted to wells being drilled and can be utilized in other applications. Other modifications and alterations of this invention will become apparent to those skilled in the art from the foregoing discussion and accompanying drawing, and it should be understood that this invention is not to be unduly limited thereto.

I claim:

1. A method for preventing fluid flow through an opening in a material comprising:
   providing a volume of synthetic sponge particles of regenerated cellulose that have been moistened, compressed, and dried while in compression;
   inserting the sponge particles with a volume of liquid that is substantially water-free;
   forcing the sponge particles against and into portions of the material adjacent the opening; and
   expanding the sponge particles by contacting said sponge particles with water.

2. A method, as set forth in claim 1, wherein the liquid used for injecting the sponge particles is crude oil.

3. A method, as set forth in claim 1, wherein the liquid used for injecting the sponge particles is diesel oil.

4. A method, as set forth in claim 1, wherein the liquid used for injecting the sponge articles is kerosene.

5. A method, as set forth in claim 1, wherein the opening is through a subterranean formation penetrated by a well bore and including injecting a volume of substantially water-free liquid downwardly through the well bore and into the formation prior to inserting the sponge particles.

6. A method, as set forth in claim 1, wherein the sponge particles are of different sizes.

7. A method, as set forth in claim 1, wherein the opening is through a subterranean formation penetrated by a well bore and the sponge particles are forced into the formation by increasing the pressure in the well bore by pumping liquid into said well bore.

8. A lost circulation material consisting of synthetic regenerated cellulose sponge particles that have been moistened with water, compressed, and dried while compressed.

9. A lost circulation material, as set forth in claim 8, wherein the sponge particles are of different sizes.